(12) United States Patent
Zhu

(10) Patent No.: US 11,310,820 B2
(45) Date of Patent: Apr. 19, 2022

(54) CROSS-CARRIER SCHEDULING METHOD AND DEVICE

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 100 days.

(21) Appl. No.: 16/636,880

(22) PCT Filed: Aug. 11, 2017

(86) PCT No.: PCT/CN2017/097051
§ 371 (c)(1),
(2) Date: Feb. 5, 2020

(87) PCT Pub. No.: WO2019/028823
PCT Pub. Date: Feb. 14, 2019

(65) Prior Publication Data
US 2020/0374908 A1 Nov. 26, 2020

(51) Int. Cl.
*H04W 72/12* (2009.01)
*H04L 5/00* (2006.01)
*H04W 72/04* (2009.01)

(52) U.S. Cl.
CPC ........ *H04W 72/1289* (2013.01); *H04L 5/001* (2013.01); *H04W 72/0446* (2013.01); *H04W 72/0453* (2013.01); *H04W 72/1278* (2013.01)

(58) Field of Classification Search
CPC ..... H04L 5/001; H04L 5/0053; H04L 5/0092; H04L 5/0098; H04W 72/0406;
(Continued)

(56) References Cited

U.S. PATENT DOCUMENTS 11,160,057 B2 * 10/2021 Lin .................. H04W 72/0413
2013/0064190 A1 3/2013 Hariharan et al.
(Continued)

FOREIGN PATENT DOCUMENTS

CN 101772179 A 7/2010
CN 103517429 A 1/2014
(Continued)

OTHER PUBLICATIONS

Intel Corporation, "Open issues for wider bandwidth operations", 3GPP TSG RAN WG1 NR Ad-Hoc#2, R1-1710583, Qingdao, P.R. China, Jun. 27-30, 2017, 7 pages.
(Continued)

*Primary Examiner* — Khaled M Kassim
*Assistant Examiner* — Kai Chang
(74) *Attorney, Agent, or Firm* — Finnegan, Henderson, Farabow, Garrett & Dunner, L.L.P.

(57) ABSTRACT

Provided in the present disclosure are a cross-carrier scheduling method and device, wherein the method comprises: sending scheduling information to a terminal, the scheduling information being used for cross-carrier scheduling a target bandwidth part on at least one target carrier by means of a scheduling carrier, wherein the target carrier is a carrier that is scheduled by the scheduling carrier and that is configured with at least one bandwidth part, the bandwidth part is a frequency domain resource pre-designated on a carrier, and the target bandwidth part is a bandwidth part that is scheduled by the scheduling carrier among all bandwidth parts on the target carrier. According to the present disclosure, a target bandwidth part on at least one target carrier may be scheduled by a scheduling carrier, and the target carrier configured with the at least one bandwidth part may be scheduled across bandwidth parts at the same time that cross-carrier scheduling is implemented, thereby achieving
(Continued)

a more flexible scheduling mode. In addition, at the same time that cross-bandwidth part scheduling is implemented, resources of different bandwidth parts on a carrier may be fully utilized, thereby reducing the blocking probability of a control signaling.

17 Claims, 10 Drawing Sheets

(58) Field of Classification Search
CPC ......... H04W 72/0446; H04W 72/0453; H04W 72/1278; H04W 72/1289
See application file for complete search history.

(56) References Cited

U.S. PATENT DOCUMENTS

| | | | |
|---|---|---|---|
| 2014/0126494 A1* | 5/2014 | Charbit | H04L 5/0073 370/329 |
| 2015/0131546 A1* | 5/2015 | Seo | H04W 72/04 370/329 |
| 2017/0318565 A1* | 11/2017 | Golitschek Edler von Elbwart | H04W 16/14 |
| 2018/0279289 A1* | 9/2018 | Islam | H04W 72/0446 |
| 2018/0279353 A1* | 9/2018 | Shaheen | H04W 72/042 |
| 2018/0367282 A1* | 12/2018 | Li | H04W 72/0446 |
| 2018/0375630 A1* | 12/2018 | Kim | H04W 72/042 |
| 2020/0077432 A1* | 3/2020 | Xiong | H04L 1/1812 |
| 2020/0163085 A1* | 5/2020 | Takeda | H04W 72/0453 |
| 2020/0177334 A1* | 6/2020 | Song | H04L 5/0048 |
| 2020/0252934 A1* | 8/2020 | Xue | H04L 5/0001 |

FOREIGN PATENT DOCUMENTS

| | | | | |
|---|---|---|---|---|
| CN | 106612547 A | | 5/2017 | |
| CN | 106714322 A | | 5/2017 | |
| CN | 108633059 A | * | 10/2018 | ........... H04L 5/0007 |
| EP | 2 306 782 A1 | | 4/2011 | |
| EP | 2 453 598 A2 | | 5/2012 | |
| KR | 10-2011-0073689 A | | 6/2011 | |
| KR | 10-2017-0072815 A | | 6/2017 | |
| KR | 10-2017-0072815 A | | 9/2021 | |
| WO | WO 2017/028889 A1 | | 2/2017 | |
| WO | WO 2019/028823 A1 | | 2/2019 | |

OTHER PUBLICATIONS

Samsung, "RAN2 consideration for bandwidth part in NR", 3GPP TSG-RAN WG2 NR Ad-hoc#2 Meeting, R2-1706427, Qingdao, China, Jun. 27-29, 2017, 5 pages.
Samsung, "RAN2 impacts from bandwidth part in NR", 3GPP TSG-RAN WG2 NR #98 Meeting, R2-1704503, Hangzhou, China, May 15-19, 2017, 5 pages.
International Search Report in International Application No. PCT/CN2017/097051, dated May 4, 2018.
3$^{rd}$ Generation Partnership Project; Technical Specification Group Radio Access Network; Study on New Radio (NR) access technology (Release 14), 3GPP TR 38.912 V14.1.0 (Jun. 2017). 74 pgs.
Grant of Patent dated Aug. 27, 2021, from the Korean Intellectual Property Office issued in counterpart Korean Application No. 10-2019-7038233.

* cited by examiner

… (1)

CROSS-CARRIER SCHEDULING METHOD AND DEVICE

CROSS REFERENCE TO RELATED APPLICATIONS

This application is a national phase application based on PCT/CN2017/097051, filed Aug. 11, 2017, the content of which is incorporated herein by reference.

TECHNICAL FIELD

The present disclosure relates to the field of communication technology, and in particular, to a cross-carrier scheduling method and apparatus.

BACKGROUND

In the related art, cross-carrier scheduling can be performed to avoid interference problems on the control channel in the heterogeneous network and to implement load balancing of the control region on different carriers. At least one other carrier is scheduled by the scheduling carrier carrying scheduling information.

In a new generation communication system, a terminal may support at least one bandwidth part on one carrier, and die terminal may have different numerologies on different carriers or bandwidth parts. However, in the related art, there is no scheme of how to schedule bandwidth part across carriers.

SUMMARY

According to a first aspect of the embodiments of the present disclosure, a cross-carrier scheduling method is provided, the method is used for a base station. The method includes:

sending scheduling information to a terminal, the scheduling information is used for cross-carrier scheduling a target bandwidth part on at least one target carrier by means of a scheduling carrier;

where the target carrier is a carrier that is scheduled by the scheduling carrier and that is configured with at least one bandwidth part, the bandwidth part is a frequency domain resource pre-designated on the carrier; and the target bandwidth part is a bandwidth part that is scheduled by the scheduling carrier among all bandwidth parts on the target carrier.

According to a second aspect of the embodiments of the present disclosure, a cross-carrier scheduling method is provided, the method is used for a terminal, and the method includes:

receiving scheduling information sent by a base station;

determining a target bandwidth part on at least one target carrier according to the scheduling information;

scheduling the target bandwidth part by a scheduling carrier where the scheduling information is located;

where the target carrier is a carrier that is scheduled by the scheduling carrier and configured with at least one bandwidth part, the bandwidth part is a pre-designated frequency domain resource on the target carrier; the target bandwidth part is a bandwidth part that is scheduled by the scheduling carrier among all bandwidth parts on the target carrier.

According to a third aspect of the embodiments of the present disclosure, a cross-carrier scheduling apparatus is provided, the apparatus is used for a base station, and the apparatus includes:

a first sending module configured to send scheduling information to a terminal, the scheduling information is used for cross-carrier scheduling a target bandwidth part on at least one target carrier by means of a scheduling carrier;

where the target carrier is a carrier that is scheduled by a scheduling carrier and that is configured with at least one bandwidth part, the bandwidth part is a frequency domain resource pre-designated on a carrier; and the target bandwidth part is a bandwidth part that is scheduled by the scheduling carrier among all bandwidth parts) the target carrier.

According to a fourth aspect of the embodiments of the present disclosure, a cross-carrier scheduling apparatus is provided, the apparatus is used for a terminal, the apparatus includes:

a receiving module configured to receive scheduling information sent by a base station;

a determining module configured to determine a target bandwidth part on at least one target carrier according to the scheduling information;

a bandwidth part scheduling module configured to schedule the target bandwidth part by a scheduling carrier where the scheduling information is located;

where the target carrier is a carrier that is scheduled by the scheduling carrier and that is configured with at least one bandwidth part, the bandwidth part is a frequency domain resource pre-designated on the target carrier; the target bandwidth part is a bandwidth part that is scheduled by the scheduling carrier among all bandwidth parts on the target carrier.

According to a fifth aspect of the embodiments of the present disclosure, a computer readable storage medium is provided, a computer program is stored in the storage medium, the computer program is configured to execute the cross-carrier scheduling method in the above described first aspect.

According to a sixth aspect of the embodiments of the present disclosure, a computer readable storage medium is provided, a computer program is stored in the storage medium, the computer program is configured to execute the cross-carrier scheduling method in the above described second aspect.

According to a seventh aspect of the embodiments of the present disclosure, a cross-carrier scheduling apparatus is provided, the apparatus is used in a base station and includes:

a processor;

a memory for storing executable instructions of the processor;

where the processor is configured to:

send scheduling information to a terminal, the scheduling information is used for cross-carrier scheduling a target bandwidth part on at least one target carrier by means of a scheduling carrier;

where the target carrier is a carrier that is scheduled by the scheduling carrier and that is configured with at least one bandwidth part, the bandwidth part is a frequency domain resource pre-designated on the carrier; and the target bandwidth part is a bandwidth part that is scheduled by the scheduling carrier among all bandwidth parts on the target carrier.

According to an eighth aspect of the embodiments of the present disclosure, a cross-carrier scheduling apparatus is provided, the apparatus is used in a terminal and includes:

a processor;

a memory for storing executable instructions of the processor;

where the processor is configured to:
receive scheduling information sent by the base station;
determine a target bandwidth part on at least one target carrier according to the scheduling information;
schedule the target bandwidth part by a scheduling carrier where the scheduling information is located;
where the target carrier is a carrier that is scheduled by the scheduling carrier and configured with at least one bandwidth part, the bandwidth part is a pre-designated frequency domain resource on the target carrier; the target bandwidth part is a bandwidth part that is scheduled by the scheduling carrier among all bandwidth parts on the target carrier.

The technical solutions provided by the embodiments of the present disclosure may include the following beneficial effects:

In the embodiments of the present disclosure, the base station may send scheduling information to the terminal, and the scheduling information may be used to schedule a target bandwidth part on at least one target carrier by scheduling carrier. where the target carrier is a carrier that is scheduled by the scheduling carrier and configured with at least one bandwidth part, the bandwidth part is a pre-designated frequency domain resource on the target carrier; the target bandwidth part is a bandwidth part that is scheduled by the scheduling carrier among all bandwidth parts on the target carrier. A target bandwidth part on at least one target carrier may be scheduled by a scheduling carrier, and the target carrier configured with the at least one bandwidth part may be scheduled across bandwidth parts at the same time that the cross-carrier scheduling is implemented, thereby achieving a more flexible scheduling mode. In addition, at the same time that the cross-bandwidth part scheduling is implemented, resources of different bandwidth parts on a carrier may be fully utilized, thereby reducing the blocking probability of a control signaling.

In the embodiments of the present disclosure, the base station may send scheduling information to the terminal through target signaling, where the target signaling includes any of the following: radio resource control signaling, system information, media access control address control unit and physical layer signaling. It has achieving simplicity and high availability.

In the embodiments of the present disclosure, if the base station separately numbers the physical resource blocks on each carrier configured for the terminal in a predefined order, the scheduling information may include carrier indication information used for indicating the scheduled carrier and PRB indication information used for indicating the scheduled physical resource block PRB in the scheduled carrier. On the terminal side, the target carrier may be determined according to the carrier indication information, further, the scheduled bandwidth part in the target carrier is determined according to the PRB indication information on a target carrier. Through the above process, when the physical resource blocks on each carrier configured with the terminal are separately numbered in a predefined order, through the carrier indication information and the PRB indication information included in the scheduling information, so that the terminal can determine a scheduled target bandwidth part. Finally, the purpose of performing cross-bandwidth scheduling on a get carrier configured with at least one bandwidth part is achieved.

In the embodiments of the present disclosure, if the base station uniformly numbers the physical resource blocks on all carriers configured for the terminal in a predefined order, then the scheduling information only needs to include PRB indication information used to indicate a scheduled physical resource block PRB. Since all carriers are numbered uniformly in a predefined order, the terminal can determine the scheduled target bandwidth part according to the PRB indication information, and finally achieve the purpose of performing cross-bandwidth scheduling on the target carrier configured with at least one bandwidth part.

In the embodiments of the present disclosure, if the base station separately numbers the physical resource blocks on each carrier configured for the terminal in a predefined order, and the bandwidth parts on each carrier are independently numbered in units of physical resource blocks in a predefined order, then the scheduling information needs to include carrier indication information used for indicating the scheduled carrier, a bandwidth part indication information used for indicating a scheduled bandwidth part in the scheduled carrier, and PRB indication information used for indicating the scheduled physical resource blocks PRBs in the scheduled bandwidth part in the scheduled carrier. After the terminal determines the target carrier according to the carrier indication information, the terminal determines the target bandwidth part that needs to be scheduled in the target carrier according to the bandwidth part indication information and the PRB indication information, thereby achieving the purpose of performing cross-bandwidth scheduling on a target carrier configured with at least one bandwidth part.

In the embodiments of the present disclosure, if a carrier scheduling information and a bandwidth part indication information are included in the scheduling information, the information length value of the carrier indication information is a first preset value, and is set at a first preset position in the scheduling information; an information length value of the bandwidth part indication information is a second preset value, and is set at a second preset position in the scheduling information; where the first preset position is the same as or different from the second preset position. That is, the information length values of the carrier indication information and the bandwidth part indication information are both preset values and are set at preset positions in the scheduling information. Certainly, the carrier indication information and the bandwidth part indication information may be respectively carried in different regions of the scheduling information by means of independent encoding, or may be carried in the same region of the scheduling information by means of joint encoding. So that the configuration of the scheduling information is more flexible.

In the embodiments of the present disclosure, if the base station separately numbers the physical resource blocks on each carrier configured for the terminal in a predefined order, and the bandwidth parts on each carrier are independently numbered in units of physical resource blocks in a predefined order, then the scheduling information may also include association information and PRB indication information used for indicating the scheduled physical resource block PRB. Where the association information is information associated with the carrier indication information and the bandwidth part scheduling information, the carrier indication information is information used for indicating a scheduled carrier, the bandwidth part indication information is information used for indicating scheduled bandwidth part. The terminal may determine the carrier indication information the bandwidth part indication information corresponding to the association information in the scheduling information according to the pre-store the mapping relationship among the association information, the carrier indication information and the bandwidth part indication information, thereby after the target carrier is determined according to the carrier indication information, the target bandwidth part is determined in the target carrier according to the bandwidth part indication information and the PRB indication information, the purpose of performing cross-bandwidth part scheduling on a target carrier configured with at least one bandwidth part is also achieved.

In the embodiments of the present disclosure, the above described association information may be predefined and may also be configured by a base station for the terminal, if the base station configures for the terminal, the base station may send the terminal of the configured association information by the target signaling, so that the terminal may determine the carrier indication information and the bandwidth part indication information corresponding to the association information in the scheduling information according to the pre-stored mapping relationship among the association information, the carrier indication information and the bandwidth part indication information by the association information. Thereby the target carrier is determined according to the carrier indication information. It has high availability.

In the embodiments of the present disclosure, after receiving the scheduling information sent by the base station, the terminal determines a target bandwidth part on the at least one target carrier according to the scheduling information, so that the target bandwidth part is scheduled by the scheduling carrier where the scheduling information is located. In one embodiment, the target carrier is a carrier that is scheduled by the scheduling carrier and configured with at least one bandwidth part, the bandwidth part is a frequency domain resource pre-designated on the target carrier; the target bandwidth part is a bandwidth part that is scheduled by the scheduling carrier among all bandwidth parts on the target carrier. Through the above described process, a target bandwidth part on at least one target carrier may be scheduled by a scheduling carrier, and the target carrier configured with the at least one bandwidth part may be scheduled across bandwidth parts at the same time that the cross-carrier scheduling is implemented, thereby achieving a more flexible scheduling way. In addition, at the same time that the cross-bandwidth part scheduling is implemented, resources of different bandwidth parts on a carrier may be fully utilized, thereby reducing the blocking probability of a control signaling.

It should be understood that the above general description and the following detailed description are merely exemplary and explanatory, and should not limit the present disclosure.

BRIEF DESCRIPTION OF THE DRAWINGS

The accompanying drawings here, which are incorporated in the specification and constitute a part of this specification, illustrate embodiments consistent with the present disclosure and explain the principles of the present disclosure in conjunction with the specification.

DETAILED DESCRIPTION

Exemplary embodiments will be described in detail herein, examples of which are illustrated in the accompanying drawings. When the following description refers to the accompanying drawings, unless other indicated, the same numbers in different accompanying drawings indicate the same or similar elements. The embodiments described in the following exemplary embodiments do not represent all embodiments consistent with the present invention. Instead, they are merely examples of apparatuses and methods consistent with aspects of the invention as detailed in the appended claims.

The terms used in the present disclosure are for the purpose of describing particular embodiments only, and are not intended to limit the disclosure. The singular forms, such as "a", "said" and "the", used in the disclosure and the appended claims are also intended to include plural forms, unless the context clearly indicates other meanings. It should also be understood that the term "and/or" used herein refers to any or all possible combinations containing one or more associated and listed items.

It should be understood that although the terms first, second, third and etc. may be used in the present disclosure to describe various information, such information should not be limited to these terms. These terms are only used to distinguish the same type of information from each other. For example, the first information may also be referred to as the second information without departing from the scope of the present disclosure, similarly, the second information may also be referred to as first information. Depending on the context, the word "if" as used herein may be interpreted as "at the time of" or "when" or "in response to a determination".

Figure 1:
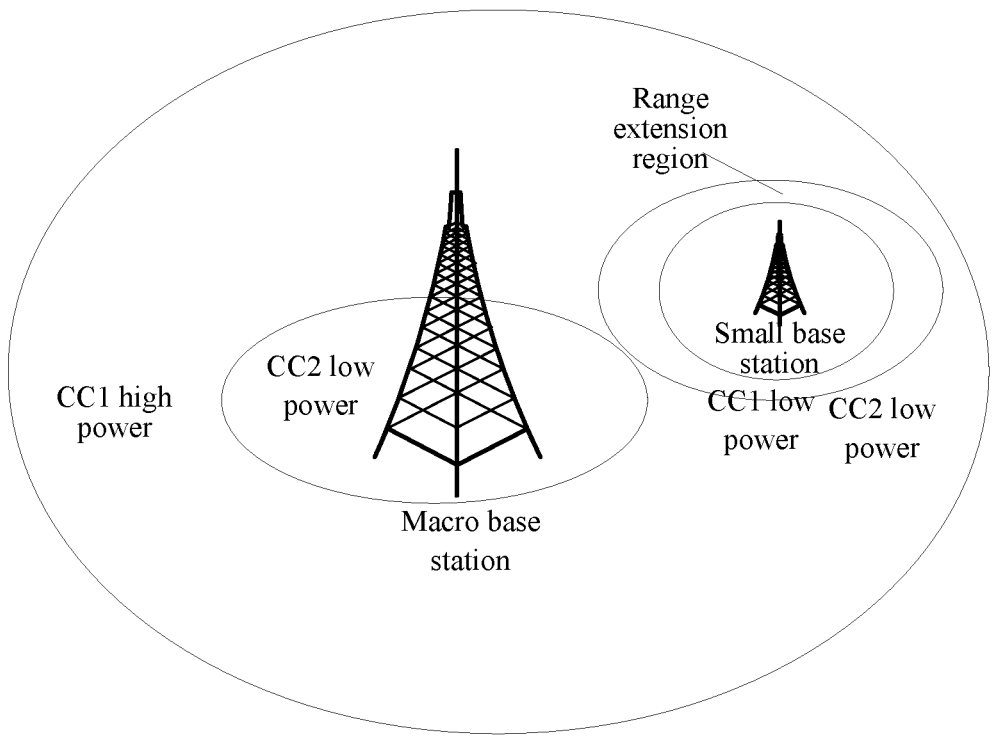
FIG. 1 is a schematic diagram of a cross-carrier scheduling scenario shown in an exemplary embodiment.

In a heterogeneous network, as shown in FIG. 1, the macro base station and the small base station can share two downlink CCs (Carrier Component), which are assumed to be CC1 and CC2. The two CCs of the small base station operate at low transmission power, the CC1 of the macro base station operates at high transmission power, and the CC2 operates at low transmission power. Especially when the Range Extension technology is used on the small base station, the transmission of the macro base station on CC1 in the range extension area has a great interference to the CC1 of the small base station, and the transmission of the macro base station on CC2 has a relatively weak interference to the small base station due to the low transmission power. Therefore, on the small base station, using the PDCCH on the CC2 to cross-carrier schedule the data on the CC1 can improve the reliability of the downlink control signaling, the macro base station may also not transmit the PDCCH on CC2, but use CC1 to cross-carrier schedule the data transmission on CC2.

Figure 2A:
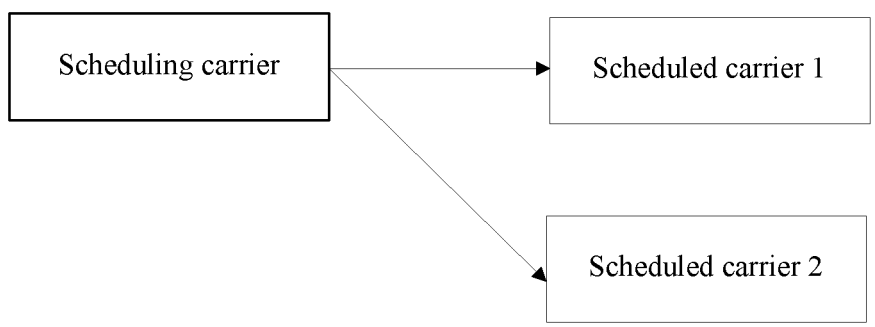
FIG. 2A to 2B are flowcharts showing a cross-carrier scheduling method according to an exemplary embodiment.
Figure 2B:
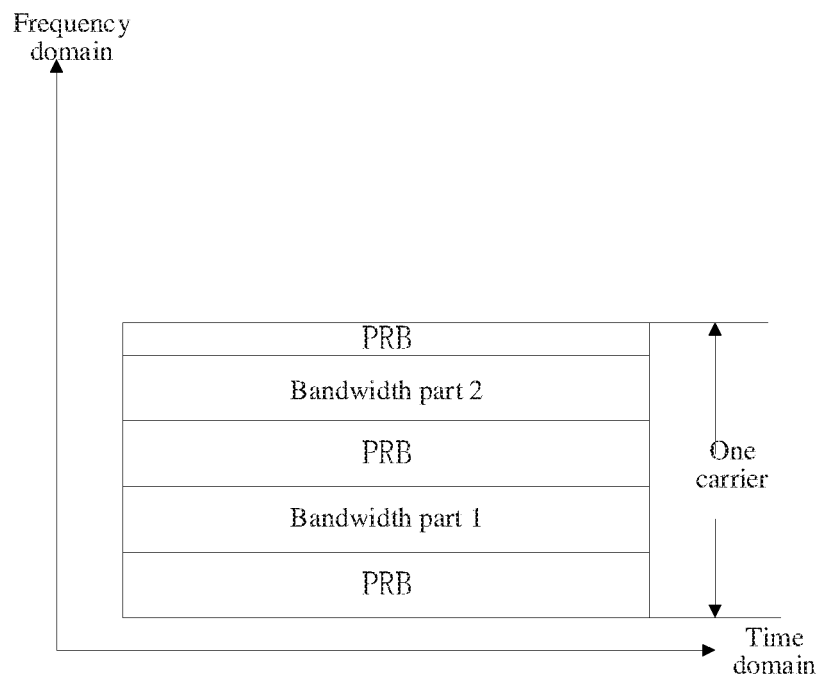

In the above scenario of the cross-carrier scheduling, the other at least one carrier may be cross-carrier scheduled by a scheduling carrier carrying scheduling information, for example, as shown in FIG. 2A. At least one bandwidth part can be supported on each carrier, as shown in FIG. 2B, in one embodiment, the bandwidth part is a frequency domain resource pre-designated on the carrier.

In order to implement scheduling across the bandwidth part, the embodiment of the present disclosure provides a cross-carrier scheduling method, which can be used in a base station, and includes the following steps:

In step 101, sending scheduling information to a terminal, the scheduling information is used for cross-carrier scheduling a target bandwidth part on at least one target carrier by means of a scheduling carrier;

In one embodiment, the target carrier is a carrier that is scheduled by the scheduling carrier and that is configured with at least one bandwidth part, the bandwidth part is a frequency domain resource pre-designated on the carrier; and the target bandwidth part is a bandwidth part that is scheduled by the scheduling carrier among all bandwidth parts on the target carrier.

In the above described embodiment, the base station sends scheduling information to the terminal, the scheduling information can be used to schedule a target bandwidth part on the at least one target carrier by means of the scheduling carrier. In one embodiment, the target carrier is a carrier that is scheduled by the scheduling carrier and configured with at least one bandwidth part, the bandwidth part is a frequency domain resource pre-designated on the target carrier; the target bandwidth part is a bandwidth part that is scheduled by the scheduling carrier among all bandwidth parts on the target carrier. Through the above process, a target bandwidth part on at least one target carrier may be scheduled by a scheduling carrier, and the target carrier configured with the at least one bandwidth part may be scheduled across bandwidth parts at the same time that the cross-carrier scheduling is implemented, thereby achieving a more flexible scheduling mode. In addition, at the same time that the cross-bandwidth part scheduling is implemented, resources of different bandwidth parts on a carrier may be fully utilized, thereby reducing the blocking probability of a control signaling. For the above described step 101, the base station may send scheduling information to the terminal by means of target signaling when determining that cross-carrier scheduling is required. Optionally, the target signaling may include any one of radio resource control signaling, system information, media access control address control unit and physical layer signaling. In the embodiment of the disclosure, in order to avoid interference on the control channel and load balancing of the control region on different carriers in the heterogeneous system, the base station may determine that the cross-carrier scheduling is currently required. In one embodiment, the control region on the carrier is a region in which the control information is mapped in the time domain and the frequency domain, and the control information may be a PDCCH, a PICH (Paging Indicator Channel), or the like.

The scheduling information is used for cross-carrier scheduling a target bandwidth part on at least one target carrier by means of a scheduling carrier. The scheduling carrier is the carrier where the scheduling information is located, the target carrier is a carrier that is scheduled by the scheduling carrier and that is configured with at least one bandwidth part, the bandwidth part is a frequency domain resource pre-designated on the carrier; and the target bandwidth part is a bandwidth part that is scheduled by the scheduling carrier among all bandwidth parts on the target carrier.

Further, the base station may send the information corresponding to the scheduling information to the terminal by means of target signaling. Optionally, when the scheduling information includes multiple pieces of information, all the scheduling information may be uniformly sent to the terminal by means of a target signaling, or different scheduling information may be separately sent to the terminal by means of different target signaling. In the embodiment of the disclosure, the base station can number PRB (Physical Resource Block) in different ways, and the information included in the scheduling information is different according to the different PRB numbering ways.

In the present disclosure, the scheduling unit on the frequency domain is granular by PRB, based on the same principle, the method in the present disclosure is also applicable to scheduling units on the frequency domain of other granularities, for example, multiple PRB bundles are used as the scheduling unit on the basic frequency domain. No matter which scheduling unit is employed, it falls within the protection scope of the embodiments of the present disclosure.

In the first way, the base station separately numbers the physical resource blocks on each carrier configured for the terminal in a predefined order.

Figure 3A:
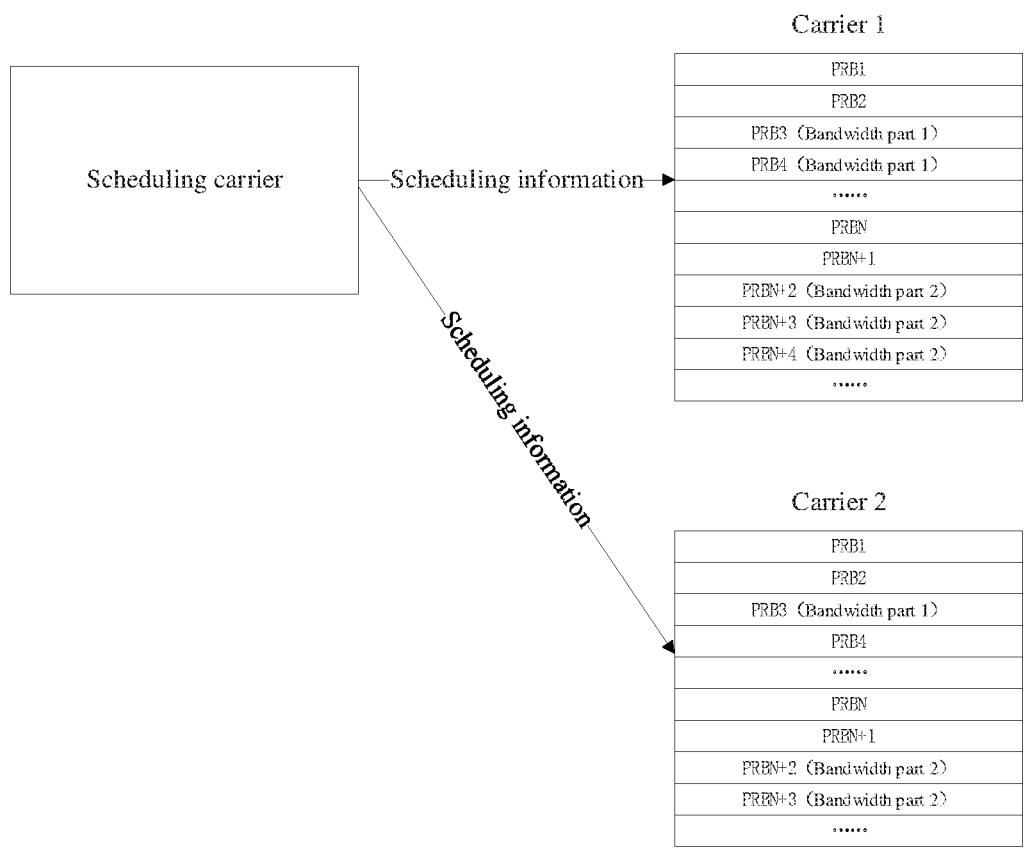
FIG. 3A to 3C are schematic diagrams of a cross-carrier scheduling scenario shown in an exemplary embodiment.

In this way, the base station can separately number the PRBs on each carrier of the same terminal in a predefined order, for ample, from small to large. For example, as shown in FIG. 3A, for the two carriers that are scheduled, the PRBs on the carrier 1 and the carrier 2 are numbered in order from small to large, respectively.

Correspondingly, the scheduling information may include carrier indication information for indicating the scheduled carrier and PRB indication information for indicating the scheduled physical resource block PRB in the scheduled carrier.

Optionally, the carrier indication information may be a carrier number.

The PRB indication information may be a number in the current carrier of the scheduled PRB in the scheduled carrier, if the amount of scheduled PRBs is multiple, the PRB indication information may include the numbers of all scheduled PRBs in the scheduled carrier. Or, in the case that the scheduled PRBs are consecutive, the PRB indication information may further include a number of the first scheduled PRB in the scheduled carrier, and the amount of scheduled PRBs; or, in the case that the scheduled PRBs are consecutive, the PRB indication information may further include a number of the first PRB and a number of the last PRB.

For example, the PRB indication information may include the number 2 of the first PRB and the amount of the scheduled PRBs of 4, then, the terminal side can determine that the scheduled PRBs in the scheduled carriers are PRB2, PRB3, PRB4 and PRB5 respectively according to the number 2 of the first PRB and the amount of the scheduled PRBs of 4.

If the amount of scheduled PRBs is multiple but not continuous, the PRB indication information may include the numbers of all scheduled PRBs in the scheduled carrier. Or the scheduled PRBs are separated in a predefined manner, and the PRB indication information may include the number of the first scheduled PRB and the amount of the scheduled PRBs. Of course, if the scheduled PRBs are spaced in a predefined manner, the PRB indication information may also include the number of the first scheduled PRB and the amount of the last scheduled PRB.

For example, the PRB indication information may include the number 2 of the first PRB and the number 8 of the last scheduled PRB, two adjacent scheduled PRBs are separated by one PRB, then the terminal side can determine that the scheduled PRBs in the scheduled carriers are PRB2, PRB4, PRB6 and PRB8, respectively.

In the embodiment of the present disclosure, the content included in the PRB indication information is not limited to the above described content, and any other content that allows the terminal to determine the PRB indication information of the scheduled PRB falls within the protection scope of the embodiment of the present disclosure.

The terminal side may determine the target carrier according to the carrier indication information in the scheduling information, further, since the base station numbers according to the PRB on each carrier, after determining the target carrier, the target bandwidth part in the target carrier can be determined according to the PRB indication information.

In the second way, the base station uniformly numbers the physical resource blocks on all carriers configured for the terminal in a predefined order.

Figure 3B:
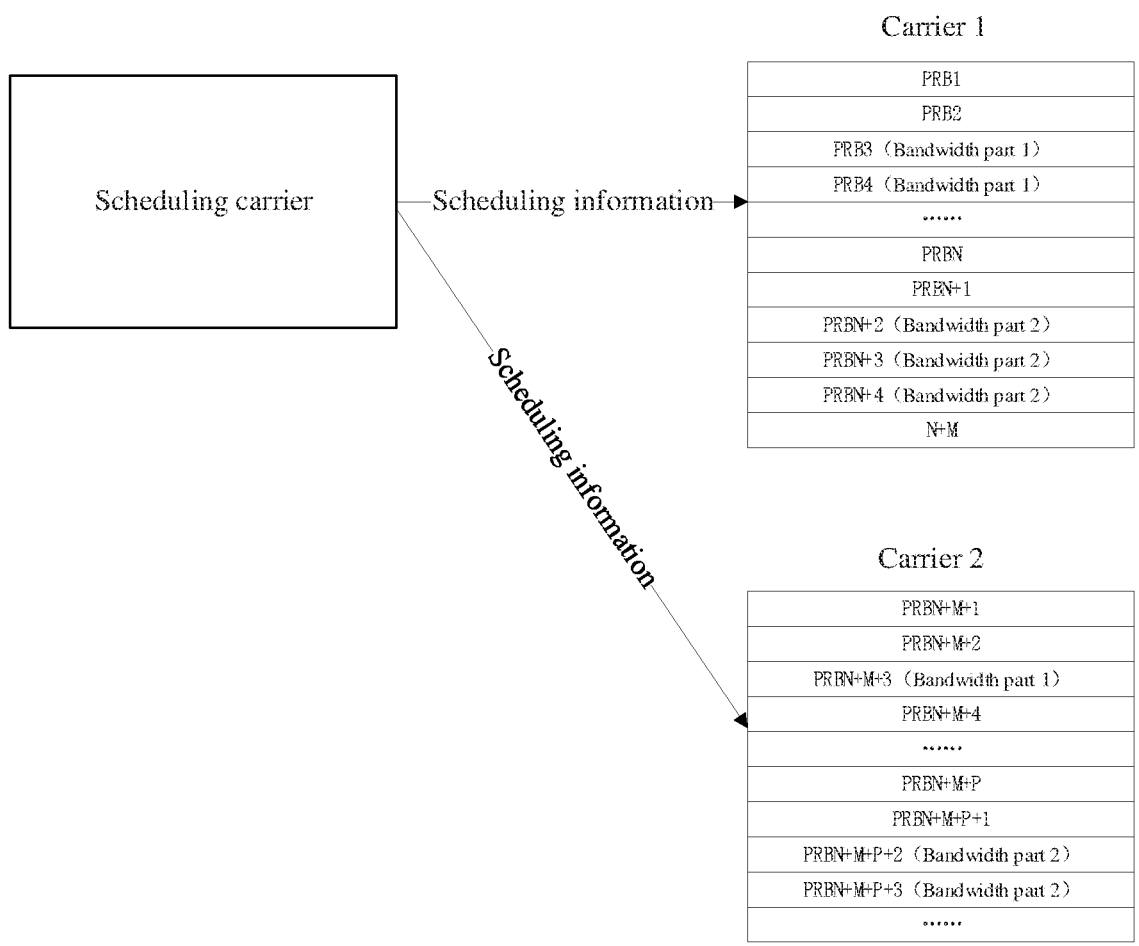

In this way, the base station numbers all PRBs on all carriers configured for the terminal in a predefined order, for example, from small to large. As shown in FIG. 3B, for the two carriers that are scheduled, all PRBs on the carrier 1 and the carrier 2 are uniformly numbered in the order from small to large.

Correspondingly, only the PRB indication information used for indicating the scheduled physical resource block PRB may be included in the scheduling information. Since the base station uniformly numbers the PRBs on all the carriers configured for the terminal, the terminal can directly find the scheduled target bandwidth part according to the PRB indication information.

In the third way, the base station separately numbers the physical resource blocks on each carrier configured for the terminal in a predefined order, and the bandwidth parts on each carrier are independently numbered in units of physical resource blocks in a predefined order.

Figure 3C:
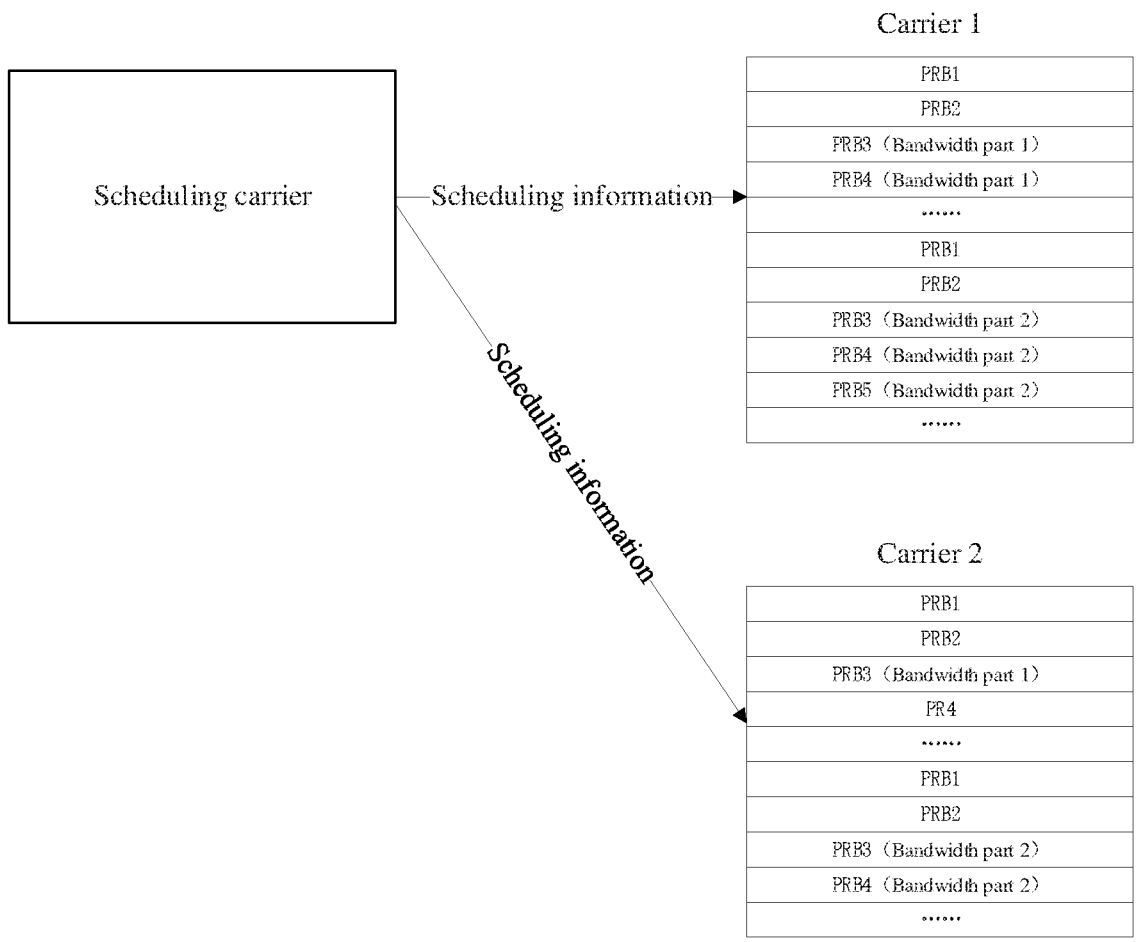

In this way, the base station not only separately numbers the PRBs on each carrier in a predefined order, for example, from small to large, but also numbers the bandwidth parts on each carrier independently in units of physical resource blocks in a predefined order, for example, from small to large. For example, as shown in FIG. 3C, for the two carriers that are scheduled, the PRBs on carrier 1 and carrier 2 are numbered separately, and the bandwidth parts on each carrier are independently numbered in units of physical resource blocks from small to large order.

Correspondingly, the scheduling information should include the carrier indication information, bandwidth part indication information used for indicating a scheduled bandwidth part in the scheduled carrier, and PRB indication information used for indicating the scheduled physical resource blocks PRBs in the scheduled bandwidth part in the scheduled carrier.

In the terminal side, the target carrier may be determined according to the carrier indication information, and then the target bandwidth part is determined in the target carrier according to the bandwidth part indication information and the PRB indication information.

In the above described embodiment, optionally, the carrier indication information and the bandwidth part indication information may be independently encoded or may be uniformly and jointly encoded. The information length value of the carrier indication information may be a first preset value, and is set in a first preset position in the scheduling information, the information length value of the bandwidth part indication information is a second preset value, and is set in a second preset position scheduling information, in one embodiment, the first preset position is the same as or different from the second preset position.

That is to say, the information length values of the carrier indication information and the bandwidth part indication information are both preset values, and are set in preset positions in the scheduling information. Certainly, the carrier indication information and the bandwidth part indication information may be respectively carried in different regions of the scheduling information by means of independent encoding, or may be carried in the same region of the scheduling information by means of joint encoding. So that the configuration of the scheduling information is more flexible, and the terminal side may parse the carrier indication information and the bandwidth part indication information according to respective preset information length values of the carrier indication information and the bandwidth part indication information at a preset position of the scheduling information.

In the above described third way, the carrier indication information and the bandwidth part indication information may be directly carried in the scheduling information. Optionally, the carrier indication information and the bandwidth part indication information may also be carried in the scheduling information by other means. For example, the scheduling information may include association information and PRB indication information used for indicating the scheduled physical resource block PRB, in one embodiment, the association information is information associated with the carrier indication information and the bandwidth part scheduling information, the carrier indication information is information used for indicating a scheduled carrier, the bandwidth part indication information is information used for indicating scheduled bandwidth part in the scheduled carrier.

The above described association information may be predefined or configured by the base station for the terminal. If the base station configures for the terminal, the base station may notify the configured association information to the terminal by using any one of the target signaling, so that the subsequent terminal determines the carrier indication information and the bandwidth part indication information according to the association information.

In one embodiment, the target signaling may be any one of radio resource control signaling, system information, media access control address control unit, and physical layer signaling.

In the embodiment of the present disclosure, optionally, the association information may be a set of predefined scrambling sequences. Each scrambling sequence in the set of scrambling sequences has a one-to-one correspondence with the carrier indication information and the bandwidth part indication information.

After scrambling on the base station side by any one of a predefined set of scrambling sequences, descrambling may be sequentially attempted by the predefined set of scrambling sequences on the terminal side, and the successfully descrambled scrambling sequence may be used as the association information included in the scheduling information.

The terminal side may pre-store the mapping relationship among the association information, the carrier indication information and the bandwidth part indication information, after receiving the above described scheduling information, the terminal may determine the carrier indication information and the bandwidth part indication information corresponding to the association information in the scheduling information according to the mapping relationships. Thereby after the target carrier is also determined according to the carrier indication information, the target bandwidth part is determined in the target carrier according to the bandwidth part indication information and the PRB indication information.

In the above described embodiment, the content included in the scheduling information may be determined according to the way in which the base station numbers the PRBs that on the carriers configured for the terminal, so as to implement cross-bandwidth part scheduling of the target carriers configured with the at least one bandwidth part.

Of course, in the embodiment of the present disclosure, the amount of the bandwidth parts configured on each carrier may be at least one, different bandwidth parts the same carrier may be continuous or discontinuous in the frequency domain, and the amount of bandwidth parts configured on different carriers may be the same or different.

Figure 4:
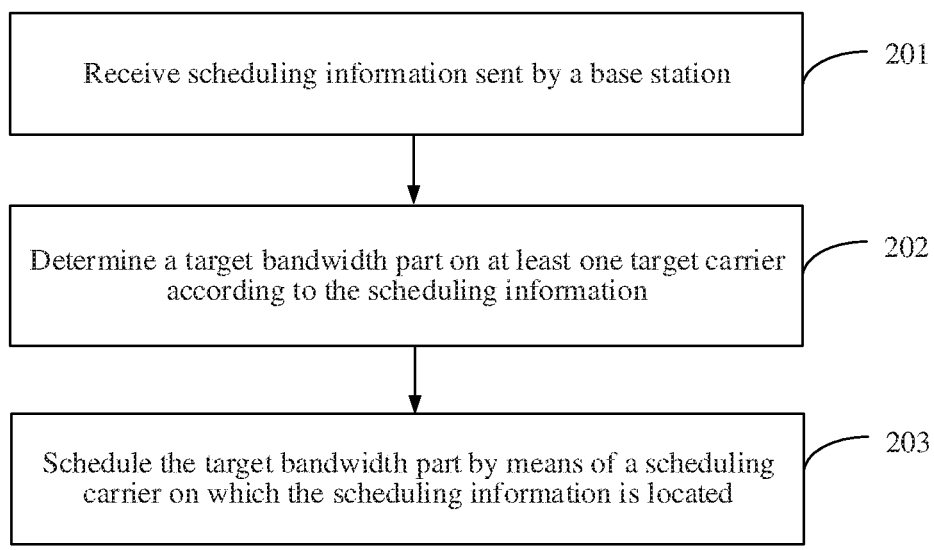
FIG. 4 is a flowchart showing another cross-carrier scheduling method according to an exemplary embodiment.

Referring to FIG. 4, FIG. 4 is a flowchart showing a cross-carrier scheduling method, which may be used in a terminal, according to an exemplary embodiment, and includes the following steps:

In step 201, receiving scheduling information sent by a base station;

In step 202, determining a target bandwidth part on at least one target carrier according to the scheduling information;

In step 203, scheduling the target bandwidth part by a scheduling carrier where the scheduling information is located;

In one embodiment, the target carrier is a carrier that is scheduled by the scheduling carrier and configured with at least one bandwidth part, the bandwidth part is a pre-designated frequency domain resource on the target carrier; the target bandwidth part is a bandwidth part that is scheduled by the scheduling carrier among all bandwidth parts on the target carrier.

In the above described embodiment, after receiving the scheduling information sent by the base station, the terminal determines a target bandwidth part on the at least one target carrier according to the scheduling information, so that the target bandwidth part is scheduled by the scheduling carrier where the scheduling information is located. In one embodiment, the target carrier is a carrier that is scheduled by the scheduling carrier and configured with at least one bandwidth part, the bandwidth part is a frequency domain resource pre-designated on the target carrier; the target bandwidth part is a bandwidth part that is scheduled by the scheduling carrier among all bandwidth parts on the target carrier. Through the above described process, a target bandwidth part on at least one target carrier may be scheduled by a scheduling carrier, and the target carrier configured with the at least one bandwidth part may be scheduled across bandwidth parts at the same time that the cross-carrier scheduling is implemented, thereby achieving a more flexible scheduling way. In addition, at the same time that the cross-bandwidth part scheduling is implemented, resources of different bandwidth parts on a carrier may be fully utilized, thereby reducing the blocking probability of a control signaling.

For the above described step 201, the base station may send the scheduling information to the terminal by the target signaling, and the terminal may directly receive the information. In one embodiment, the target signaling may be any one of radio resource control signaling, system information, media access control address control unit and physical layer signaling.

When the scheduling information includes multiple pieces of information, the base station may send all the scheduling information by means of a target signaling, or may send different scheduling information separately by means of different target signaling.

For the above described step 202, the terminal may determine the target bandwidth part according to the way in which the base station numbers the PRBs on the carrier, and the information included in the scheduling information.

Figure 5:
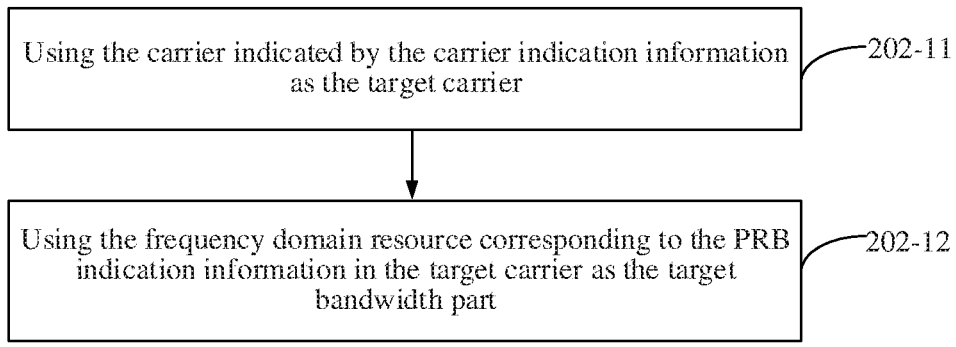
FIG. 5 is a flowchart showing another cross-carrier scheduling method according to an exemplary embodiment.

If the base station separately numbers the physical resource blocks on each carrier configured for the terminal in a predefined order, the scheduling information includes carrier indication information used for indicating the scheduled carrier and PRB indication information used for indicating the scheduled physical resource block PRB in the scheduled carrier. Referring to FIG. 5, FIG. 5 is a flowchart of another cross-carrier scheduling method according to the embodiment shown in FIG. 4. The step 202 may include the following steps:

In step 202-11, using the carrier indicated by the carrier indication information as the target carrier;

In this step, the terminal may directly use the carrier indicated by the carrier indication information as the target carrier.

In step 202-12, using the frequency domain resource corresponding to the PRB indication information in the target carrier as the target bandwidth part.

In this step, the terminal uses the frequency domain resource corresponding to the PRB indication information as the target bandwidth part in the target carrier.

For example, the carrier indication information included in the scheduling information is 2, the PRB indication information is the PRB number 5, 6, 7 and 8, then the terminal uses the carrier 2 in FIG. 3A as the target carrier, and further uses the frequency domain resources corresponding to PRB5, PRB6, PRB7 and PRB8 in carrier 2 as the target bandwidth part.

If the base station uniformly numbers the physical resource blocks on all carriers configured for the terminal in a predefined order, only the PRB indication information used for indicating the scheduled physical resource block PRB is included in the scheduling information. The step 202 may include the following steps:

In step 202-21, using the frequency domain resource corresponding to the PRB indication information as the target bandwidth part.

In this step, the terminal may directly use the frequency domain resource corresponding to the PRB indication information as the target bandwidth part.

For example, the PRB indication information included in the scheduling information in FIG. 3B is the number 6 of the first PRB, and the amount of the scheduled PRBs is 5, the scheduled PRBs are consecutive, the terminal directly uses the frequency domain resources corresponding to PRB6, PRB7, PRB8, PRB9, and PRB10 as the target bandwidth part.

Figure 6:
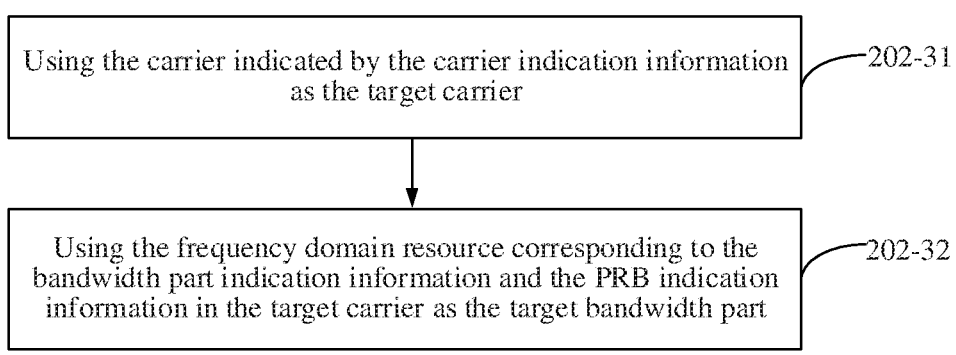
FIG. 6 is a flowchart showing another cross-carrier scheduling method according to an exemplary embodiment.

If the base station separately numbers the physical resource blocks on each carrier configured for the terminal in a predefined order, and the bandwidth parts on each carrier are independently numbered in units of physical resource blocks in a predefined order, the scheduling information at this time includes carrier indication information used for indicating the scheduled carrier, bandwidth part indication information used for indicating a scheduled bandwidth part in the scheduled carrier, and PRB indication information used for indicating the scheduled physical resource blocks PRBs in the scheduled bandwidth part in the scheduled carrier. Referring to FIG. 6, FIG. 6 is a flowchart of another cross-carrier scheduling method according to the embodiment shown in FIG. 4. The step 202 may include the following steps:

In step 202-31, using the carrier indicated carrier indication information as the target carrier;

In this step, the terminal may use the carrier indicated by the carrier indication information as the scheduled target carrier.

In step 202-32, using the frequency domain resource corresponding to the bandwidth part indication information and the PRB indication information in the target carrier as the target bandwidth part.

In this step, the terminal may use the frequency domain resource corresponding to the bandwidth part indication information and the PRB as the target bandwidth part in the target carrier.

For example, in FIG. 3C, the carrier indication information is 1, the bandwidth part indication formation is 2, and the PRB indication information is that PRB numbers 5, 6, and 7, and the terminal uses carrier 1 as the target carrier, further, in the carrier 1, the frequency domain resources corresponding to the PRB5, the PRB6, and the PRB7 in the bandwidth part 2 are used as the target bandwidth part.

In above described embodiments, in order to allow the terminal to parse the carrier indication information and the bandwidth part indication information, the information length value of the carrier indication information may be a first preset value, and is set in a first preset position in the scheduling information; the information length value of the bandwidth part indication information may be a second preset value, and is set in a second preset position in the scheduling information; in one embodiment, the first preset position is the same as or different from the second preset position. That is to say, the carrier indication information and the bandwidth part indication information may be respectively carried in different regions of the scheduling information by means of independent encoding, or may be carried in the same region of the scheduling information by means of joint encoding. So that the configuration of the scheduling information is more flexible.

The terminal may parse the carrier indication information and the bandwidth part indication information according to respective preset information length values of the carrier indication information and the bandwidth part indication information at a preset position of the scheduling information.

In the above described embodiments, the carrier indication information and the bandwidth part indication information are directly carried in the scheduling information. Optionally, the base station separately numbers the physical resource blocks on each carrier configured for the terminal in a predefined order, and the bandwidth parts on each carrier are independently numbered in units of physical resource blocks in a predefined order, the scheduling information may include association information and PRB indication information used to indicate the scheduled physical resource block PRB.

Figure 7:
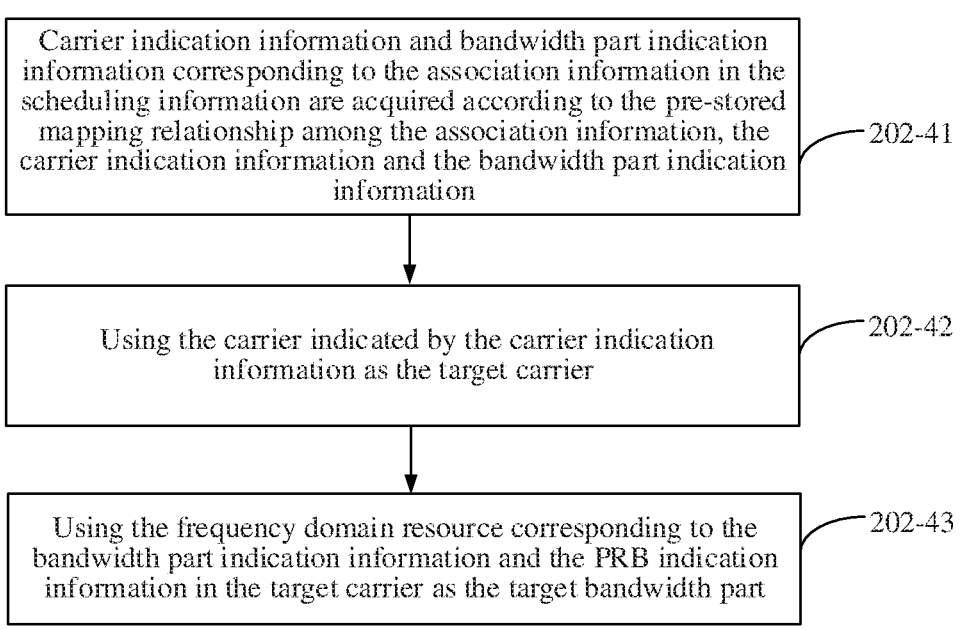
FIG. 7 is a flowchart showing another cross-carrier scheduling method according to an exemplary embodiment.

Referring to FIG. 7, FIG. 7 is a flowchart of another cross-carrier scheduling method according to the embodiment shown in FIG. 4. The step 202 may include the following steps:

In step 202-41, the carrier indication information and the bandwidth part indication information corresponding to the association information in the scheduling information are acquired according to the pre-stored mapping relationship among the association information, the carrier indication information and the bandwidth part indication information;

In this step, the terminal may pre-store the mapping relationship among the association information, the carrier indication information and the bandwidth part indication information, the association information may optionally be a scrambling sequence, and the mapping relationship may be as shown in Table 1.

TABLE 1

| scrambling sequence | carrier indication information | bandwidth part indication information |
|---|---|---|
| Scrambling sequence 1 | 1 | 3 |
| scrambling sequence 2 | 1 | 2 |
| ... | ... | ... |
| scrambling sequence n | N | M |

The terminal may attempt to descramble the information corresponding to the PBCH or the SS block according to the scrambling sequence of Table 1, the scrambling sequence successfully descrambled is the association information included in the scheduling information, further, the carrier indication information and the bandwidth part indication information corresponding to the scrambling sequence in the scheduling information may be determined according to Table 1.

In step 202-42, using the carrier indicated by the carrier indication information as the target carrier;

In this step, the terminal may use the carrier indicated by the carrier indication information as the target carrier.

In step 202-43, using the frequency domain resource corresponding to the bandwidth part indication information and the PRB indication information in the target carrier as the target bandwidth part.

In this step, after determining the target carrier, the terminal uses the frequency domain resource corresponding to the bandwidth part indication information and the PRB indication information in the target carrier as the target bandwidth part.

For the above described step 203, after determining the target bandwidth part, the terminal may schedule the target bandwidth part by using the scheduling carrier where the scheduling information is located according to the related technology. For example, different signaling or data is carried through the target bandwidth part.

In the above described embodiments, the terminal may determine the target bandwidth part according to different numbering ways of the base station to the PRB and different information included in the scheduling information. Thereby scheduling the target bandwidth part by the scheduling carrier, and the target carrier configured with the at least one bandwidth part may be scheduled across bandwidth parts at the same time that the cross-carrier scheduling is implemented, thereby achieving a more flexible scheduling way. In addition, at the same time that the cross-bandwidth part scheduling is implemented, resources of different bandwidth parts on a carrier may be fully utilized, thereby reducing the blocking probability of a control signaling.

Figure 8:
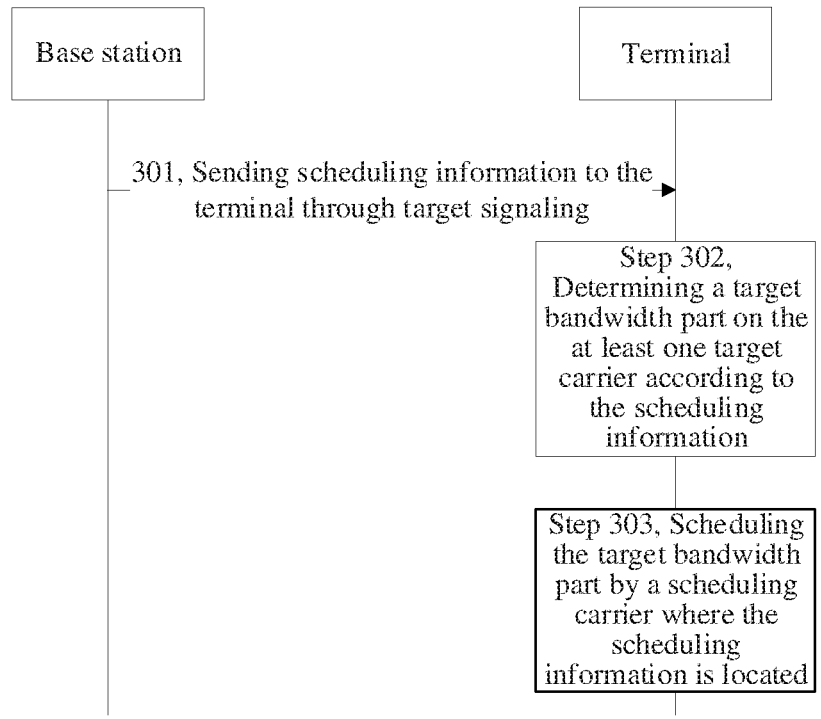
FIG. 8 is a flowchart showing another cross-carrier scheduling method according to an exemplary embodiment.

Referring to FIG. 8, FIG. 8 is a flowchart of another cross-carrier scheduling method according to an exemplary embodiment, the method includes the following steps:

In step 301, the base station sending scheduling information to the terminal through target signaling.

In one embodiment, the target signaling may include any one of radio resource control signaling, system information, media access control address control unit and physical layer signaling. When the scheduling information includes multiple pieces of information, all the scheduling information may be uniformly sent to the terminal by means of a target signaling, or different scheduling information may be separately sent to the terminal by means of different target signaling.

The base station numbers the PRBs in advance according to the above described ways. The numbering ways are different, so that the information included in the scheduling information is different.

In step 302, the terminal determines a target bandwidth part on the at least one target carrier according to the scheduling information.

In this step, the terminal may determine the target bandwidth part on the at least one target carrier according to the information and according to the ways provided in the above described embodiments.

In step 303, the terminal scheduling the target bandwidth part by a scheduling carrier where the scheduling information is located.

In the above described embodiments, a target bandwidth part on at least one target carrier may be scheduled by a scheduling carrier, and the target carrier configured with the at least one bandwidth part may be scheduled across bandwidth parts at the same time that the cross-carrier scheduling is implemented, thereby achieving a more flexible scheduling mode. In addition, at the same time that the cross-bandwidth part scheduling is implemented, resources of different bandwidth parts on a carrier may be fully utilized, thereby reducing the blocking probability of a control signaling.

To the above described method embodiments, for the sake of simple description, they are all described as a series of action combinations, however, it should be understood by those skilled in the art that the present disclosure is not limited by the described order of acts, as some steps may be performed in other orders or simultaneously in accordance with the present disclosure.

In addition, those skilled in the art should also understand that the embodiments described in the specification are all optional embodiments, and the actions and modules involved are not necessarily required by the disclosure.

Corresponding to the embodiment of the implementation method of the above described application function, the present disclosure also provides implementation apparatus for the application function and corresponding embodiments.

Figure 9:
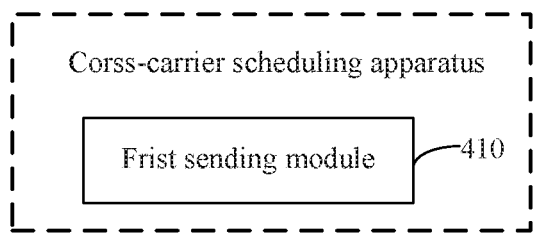
FIG. 9 is a block diagram showing a cross-carrier scheduling apparatus according to an exemplary embodiment.

Referring to FIG. 9 which is a block diagram of a cross-carrier scheduling apparatus according to an exemplary embodiment, the apparatus is used in a base station, and the apparatus includes:

a first sending module 410 configured to send scheduling information to a terminal, the scheduling information is used for miss-carrier scheduling a target bandwidth part on at least one target carrier by means of a scheduling carrier;

In one embodiment, the target carrier is a carrier that is scheduled by a scheduling carrier and that is configured with at least one bandwidth part, the bandwidth part is a frequency domain resource pre-designated on a carrier; and the target bandwidth part is a bandwidth part that is scheduled by the scheduling carrier among all bandwidth parts on the target carrier.

Figure 10:
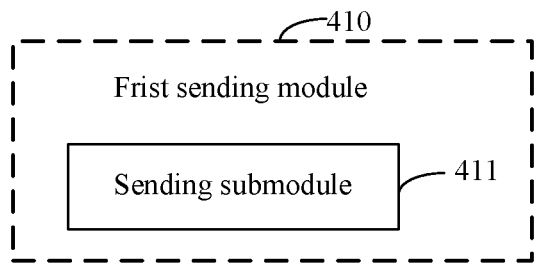
FIG. 10 is a block diagram showing another cross-carrier scheduling apparatus according to an exemplary embodiment.

Referring to FIG. 10, FIG. 10 is a block diagram of another cross-carrier scheduling apparatus according to the embodiment shown in FIG. 9. The first sending module 410 includes:

a sending submodule 411 configured to send scheduling information to a terminal by means of target signaling, in one embodiment, the target signaling includes any one of the following:

radio resource control signaling, system information, media access control address control unit and physical layer signaling.

Optionally, if physical resource blocks on each carrier configured for the terminal are numbered separately in a predefined order, then the scheduling information includes:

carrier indication information for indicating a scheduled carrier; and

PRB indication information for indicating the scheduled physical resource block PRB in a scheduled carrier.

Optionally, if physical resource blocks on all carriers configured for the terminal are numbered uniformly in a predefined order, then the scheduling information includes:

PRB indication information used for indicating a scheduled physical resource block PRB.

Optionally, if physical resource blocks on each carrier configured for the terminal are numbered separately in a predefined order, and the bandwidth parts on each carrier are independently numbered in units of physical resource blocks in a predefined order, then the scheduling information includes:

carrier indication information used for indicating a scheduled carrier; and a bandwidth part indication information used for indicating a scheduled bandwidth part in a scheduled carrier; and PRB indication information used for indicating scheduled physical resource blocks PRBs in a scheduled bandwidth part in a scheduled carrier.

Optionally, an information length value of the carrier indication information is a first preset value, and is set in a first preset position in the scheduling information;

an information length value of the bandwidth part indication information is a second preset value, and is set in a second preset position in the scheduling information;

in one embodiment, the first preset position is the same as or different from the second preset position.

Optionally, if physical resource blocks on each carrier configured for the terminal are separately numbered in a predefined order, and the bandwidth parts on each carrier are independently numbered in units of physical resource blocks in a predefined order, then the scheduling information includes:

association information; and

PRB indication information used to indicate a scheduled physical resource block PRB;

In one embodiment, the association information is information associated with carrier indication information and a bandwidth part scheduling information, the carrier indication information is information used for indicating a scheduled carrier, the bandwidth part indication information is information used for indicating a scheduled bandwidth part in a scheduled carrier.

Figure 11:
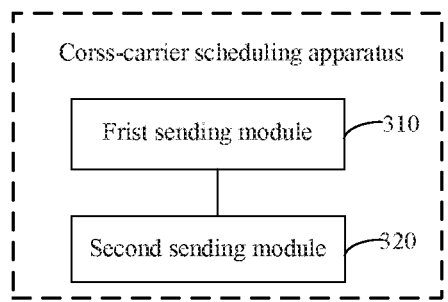
FIG. 11 is a block diagram showing another cross-carrier scheduling apparatus according to an exemplary embodiment.

Optionally, the association information is predefined or configured by the base station for the terminal;

If the association information is configured by the base station for the terminal, referring to FIG. 11, FIG. 11 is a block diagram of another cross-carrier scheduling apparatus according to the embodiment shown in FIG. 9, and the apparatus further includes:

a second sending module 420 configured to send the association information to the terminal by target signaling;

in one embodiment, the target signaling includes any one of the following: radio resource control signaling, system information, media access control address control unit and physical layer signaling.

Figure 12:
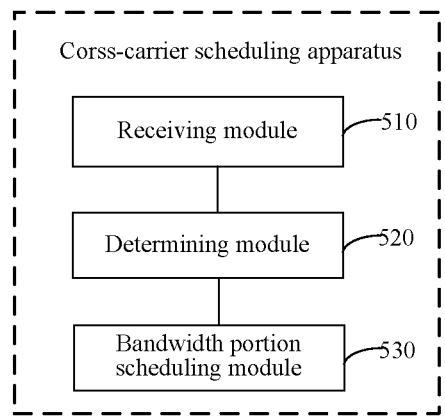
FIG. 12 is a block diagram showing another cross-carrier scheduling apparatus according to an exemplary embodiment.

Referring to FIG. 12, a block diagram showing another cross-carrier scheduling apparatus according to an exemplary embodiment. The apparatus is used for a terminal, and the apparatus includes:

a receiving module 510 configured to receive scheduling information sent by a base station;

a determining module 520 configured to determine a target bandwidth part on at least one target carrier according to the scheduling information;

a bandwidth part scheduling module 530 configured to schedule the target bandwidth part by a scheduling carrier where the scheduling information is located;

In one embodiment, the target carrier is a carrier that is scheduled by the scheduling carrier and that is configured with at least one bandwidth part, the bandwidth part is a frequency domain resource pre-designated on the target carrier; the target bandwidth part is a bandwidth part that is scheduled by the scheduling carrier among all bandwidth parts on the target carrier.

Figure 13:
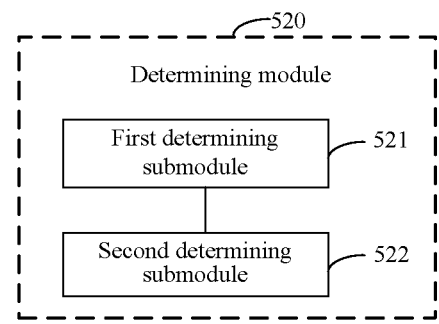
FIG. 13 is a block diagram showing another cross-carrier scheduling apparatus according to an exemplary embodiment.

Referring to FIG. 13, FIG. 13 is a block diagram showing another cross-carrier scheduling apparatus on the basis of the embodiment shown in FIG. 12, and the determining module 520 includes:

a first determining submodule 521 configured to use the carrier indicated by the carrier indication information as the target carrier if the scheduling information includes carrier indication information used for indicating a scheduled carrier and PRB indication information used for indicating a scheduled physical resource block PRB in a scheduled carrier;

a second determining submodule 522 configured to use frequency domain resource corresponding to the PRB indication information in the target carrier as the target bandwidth part.

Figure 14:
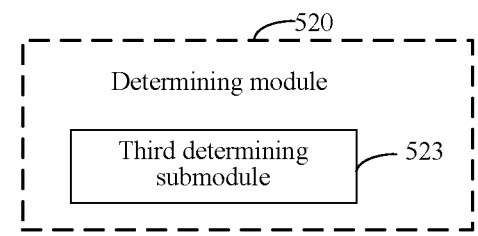
FIG. 14 is a block diagram showing another cross-carrier scheduling apparatus according to an exemplary embodiment.

Referring to FIG. 14, FIG. 14 is a block diagram showing another cross-carrier scheduling apparatus on the basis of the embodiment shown in FIG. 12, and the determining module 520 includes:

a third determining submodule 523 configured to use frequency domain resource corresponding to the PRB indication information as the target bandwidth part if the scheduling information includes PRB indication information of a scheduled physical resource block PRB.

Figure 15:
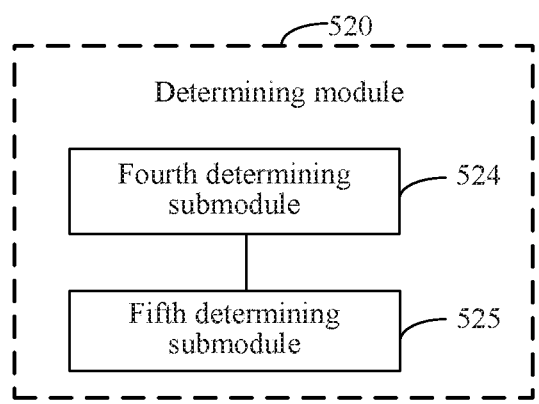
FIG. 15 is a block diagram showing another cross-carrier scheduling apparatus according to an exemplary embodiment.

Referring to FIG. 15, the FIG. 15 is a block diagram showing another cross-carrier scheduling apparatus on the basis of the embodiment shown in FIG. 12, the determining module 520 includes:

a fourth determining submodule 523 configured to use the carrier indicated by the carrier indication information as the target carrier if the scheduling information includes carrier indication information used for indicating a scheduled carrier, a bandwidth part indication information used for indicating a scheduled bandwidth part in a scheduled carrier and PRB indication information used for indicating scheduled physical resource blocks PRBs in a scheduled bandwidth part in a scheduled carrier;

a fifth determining submodule 525 configured to use the frequency domain resource corresponding to the bandwidth part indication information and the PRB indication information in the target carrier as the target bandwidth part.

Figure 16:
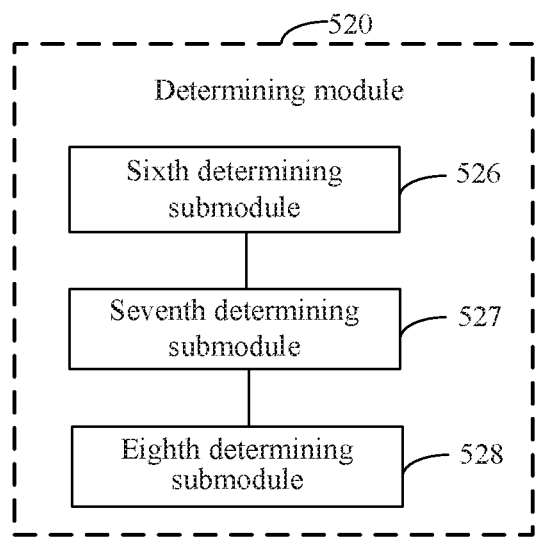
FIG. 16 is a block diagram showing another cross-carrier scheduling apparatus according to an exemplary embodiment.

Referring to FIG. 16, the FIG. 16 is a block diagram showing another cross-carrier scheduling apparatus on the basis of the embodiment shown in FIG. 12, the determining module 520 includes:

a sixth determining submodule 526 configured to obtain carrier indication information and a bandwidth part indication information corresponding to association information in the scheduling information according to a pre-stored mapping relationship among the association information, carrier indication information and a bandwidth part indication information if the scheduling information carries association information and PRB indication information which is used to indicate a scheduled physical resource block PRB;

a seventh determining submodule 527 configured to use the carrier indicated by the carrier indication information as the target carrier;

an eighth determining submodule 528 configured to use frequency domain resource corresponding to the bandwidth part indication information and the PRB indication information in the target carrier as the target bandwidth part.

For the apparatus embodiment, since it basically corresponds to the method embodiment, the relevant part may refer to the description of the method embodiment. The apparatus embodiments described above are only schematic, and the units described above as separate components may or may not be physically separated, the components displayed as units may or may not be physical units, and may be located in one place, or may be distributed on multiple network units. Some or all of the modules can be selected according to actual needs to achieve the objectives of the solution of the present disclosure. Those of ordinary skill in the art can understand and implement without creative efforts.

Accordingly, the present disclosure also provides a computer readable storage medium, a computer program is stored in the storage medium, and the computer program is used to execute any one of the cross-carrier scheduling methods described above for the base station side.

Accordingly, the present disclosure also provides a computer readable storage medium, a computer program is stored in the storage medium, and the computer program is used to execute any one of the cross-carrier scheduling methods described above for the terminal side.

Accordingly, the present disclosure also provides a cross-carrier scheduling apparatus, the apparatus is used for a base station, including:

a processor;

a memory for storing executable instructions of the processor;

where the processor is configured to:

send scheduling information to a terminal, the scheduling information is used for cross-carrier scheduling a target bandwidth part on at least one target carrier by means of a scheduling carrier;

In one embodiment, the target carrier is a carrier that is scheduled by the scheduling carrier and that is configured with at least one bandwidth part, the bandwidth part is a frequency domain resource pre-designated on the carrier; and the target bandwidth part is a bandwidth part that is scheduled by the scheduling carrier among all bandwidth parts on the target carrier.

Figure 17:
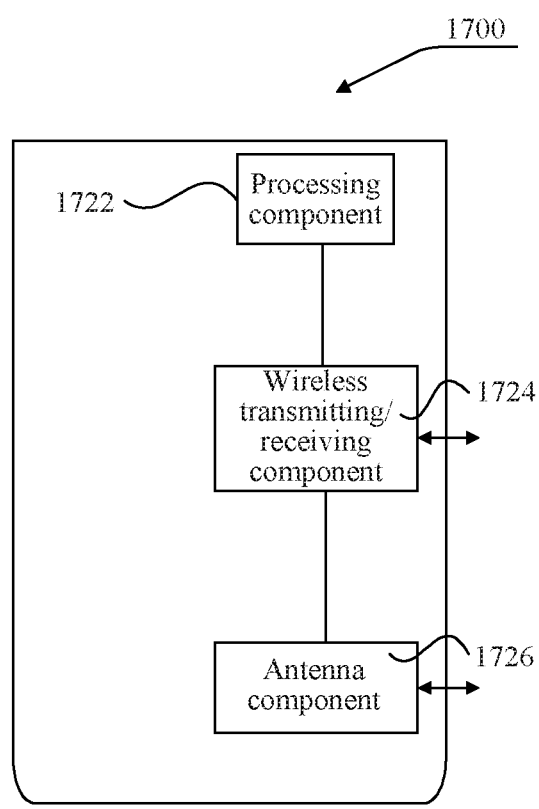
FIG. 17 is a schematic structural diagram showing an apparatus used for cross-carrier scheduling according to an exemplary embodiment of the present disclosure.

As shown in FIG. 17, FIG. 17 is a schematic structural diagram of a cross-carrier scheduling apparatus 1800 according to an exemplary embodiment. The apparatus 1800 may be provided as a base station. Referring to FIG. 17, the apparatus 1800 includes a processing component 1722, a wireless transmitting/receiving component 1724, an antenna component 1726 and a signal processing portion specific to the wireless interface. The processing component 1722 can further include one or more processors.

One processor of the processing component 1722 may be configured to:

send scheduling information to a terminal, the scheduling information is used for cross-carrier scheduling a target bandwidth part on at least one target carrier by means of a scheduling carrier;

In one embodiment, the target carrier is a carrier that is scheduled by the scheduling carrier and that is configured with at least one bandwidth part, the bandwidth part is a frequency domain resource pre-designated on a carrier; and the target bandwidth part is a bandwidth part that is scheduled by the scheduling carrier among all bandwidth parts on the target carrier.

Accordingly, the present disclosure also provides a cross-carrier scheduling apparatus, the apparatus is used for a terminal, including:

a processor;

a memory for storing executable instructions of the processor;

where the processor is configured to:

receive scheduling information sent by the base station;

determine a target bandwidth part on at least one target carrier according to the scheduling information;

schedule the target bandwidth part by a scheduling carrier where the scheduling information is located;

In one embodiment, the target carrier is a carrier that is scheduled by the scheduling carrier and configured with at least one bandwidth part, the bandwidth part is a pre-designated frequency domain resource on the target carrier; the target bandwidth part is a bandwidth part that is scheduled by the scheduling carrier among all bandwidth parts on the target carrier.

Figure 18:
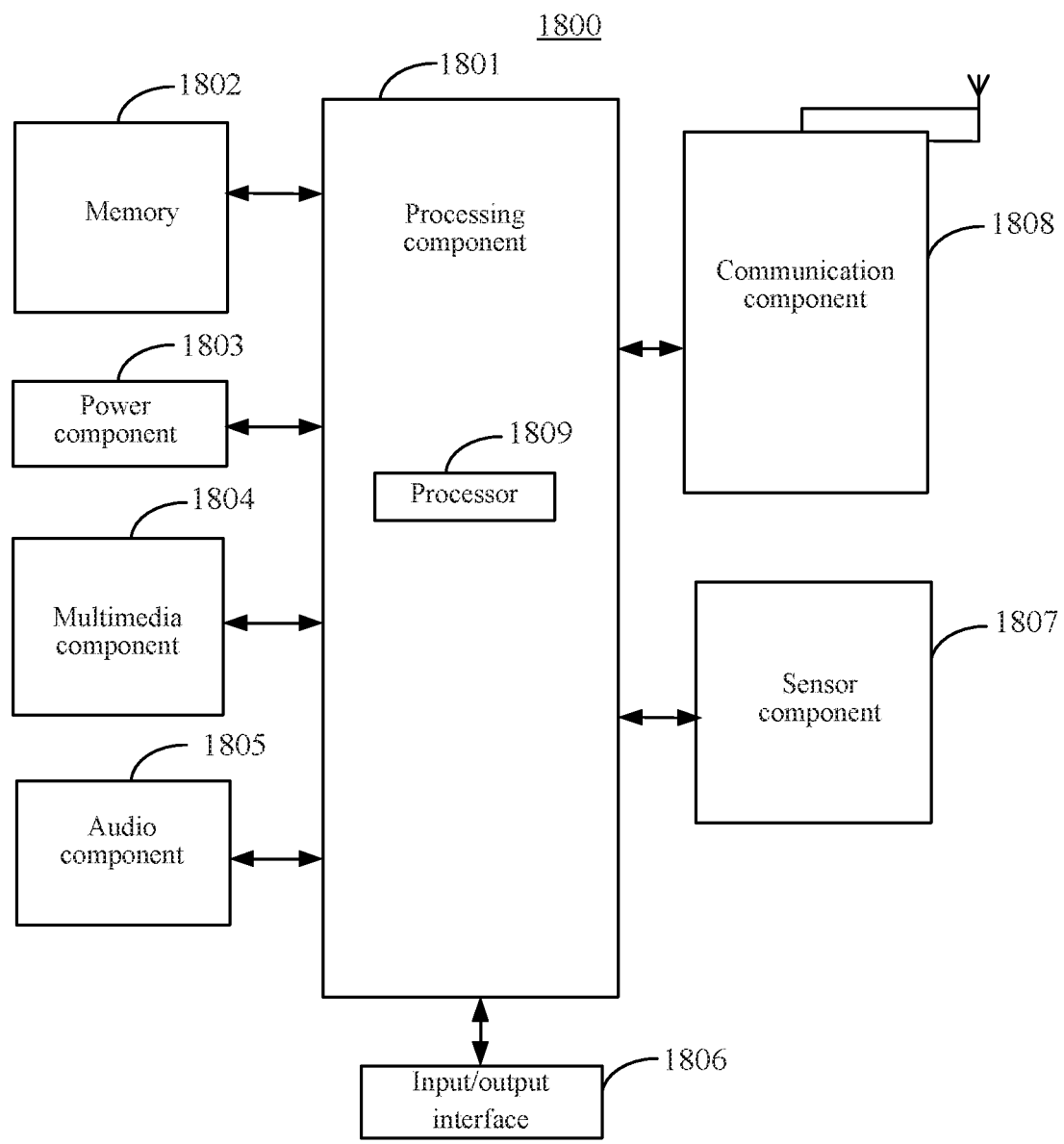
FIG. 18 is a schematic structural diagram showing another apparatus used for cross-carrier scheduling according to an exemplary embodiment of the present disclosure.

FIG. 18 is a schematic structural diagram of a cross-carrier scheduling apparatus according to an exemplary embodiment. As shown in FIG. 18, a cross-carrier scheduling apparatus 1800 is shown according to an exemplary embodiment, the apparatus 1800 may be a terminal, such as a computer, a mobile phone, a digital broadcast terminal, a messaging device, a game console, a tablet device, a medical device, a fitness device, a personal digital assistant and the like.

Referring to FIG. 18, the apparatus 1800 may include one or more of the following components: a processing component 1801, a memory 1802, a power component 1803, a multimedia component 1804, an audio component 1805, an input/output (I/O) interface 1806, a sensor component 1807 and a communication component 1808.

The processing component 1801 typically contra's overall operations of the apparatus 1800, such as the operations associated with display, telephone calls, data communications, camera operations and recording operations. The processing component 1801 may include one or more processors 1809 to execute instructions to perform all or part of the steps in the above described methods. Moreover, the processing component 1801 may include one or more modules which facilitate the interaction between the processing component 1801 and other components. For instance, the processing component 1801 may include a multimedia module to facilitate the interaction between the multimedia component 1804 and the processing component 1801.

The memory 1802 is configured to store various types of data to support the operation of the apparatus 1800. Examples of such data include instructions for any applications or methods operated on the apparatus 1800, contact data, phonebook data, messages, pictures, video and etc. The memory 1802 may be implemented by using any type of volatile or non-volatile memory devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory and a magnetic or optical disk.

The power component 1803 provides power to various components of the apparatus 1800. The power component 1803 may include a power management system, one or more power sources and any other components associated with the generation, management and distribution of power for the apparatus 1800.

The multimedia component 1804 includes a screen providing an output interface between the apparatus 1800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips and gestures on the touch panel. The touch sensors may not only sense a boundary of a touch or slip action, but also sense a period of time and a pressure associated with the touch or slip action. In some embodiments, the multimedia component 1804 includes a front camera and/or a rear camera. The front camera and the rear camera may receive an external multimedia data when the apparatus 1800 is in an operation mode, such as a photographing mode or a video mode. Each of the front camera and the rear camera may be a fixed optical lens system or have focus and optical zoom capability.

The audio component 1805 is configured to output and/or input audio signals. For example, the audio component 1805 includes a microphone (MIC) configured to receive an external audio signal when the apparatus 1800 is in an operation mode, such as a call mode, a recording mode or a voice recognition mode. The received audio signal may be further stored in the memory 1802 or transmitted via the communication component 1808. In some embodiments, the audio component 1805 further includes a speaker to output audio signals.

The I/O interface 1806 provides an interface between the processing component 1801 and peripheral interface modules, the above peripheral interface modules such as a keyboard, a click wheel, buttons and the like. These buttons may include, but are not limited to, a home button, a volume button, a starting button or a locking button.

The sensor component 1807 includes one or more sensors to provide status assessments of various aspects for the apparatus 1800. For instance, the sensor component 1807 may detect an open/closed status of the apparatus 1800, relative positioning of components, e.g., the components may be the display and the keypad of the apparatus 1800; the sensor component 1807 may also detect a change in position of the apparatus 1800 or a component of the apparatus 1800, a presence or absence of user contact with the apparatus 1800, an orientation or an acceleration/deceleration of the apparatus 1800 and a change in temperature of the apparatus 1800. The sensor component 1807 may include a proximity sensor configured to detect the presence of nearby objects without any physical contact. The sensor component 1807 may further include a light sensor, such as a CMOS or CCD image sensor configured to use in imaging applications. In some embodiments, the sensor component 1807 may further include an accelerometer sensor, a gyroscope sensor, a magnetic sensor, a pressure sensor or a temperature sensor.

The communication component 1808 is configured to facilitate communication, wired or wirelessly, between the apparatus 1800 and other devices. The apparatus 1800 can access a wireless network based on a communication standard, such as WiFi, 2G, or 3G or a combination thereof. In one exemplary embodiment, the communication component 1808 receives a broadcast signal or broadcast-association information from an external broadcast management system via a broadcast channel. In one exemplary embodiment, the communication component 1808 further includes a near field communication (NFC) module to facilitate short-range communications. For example, the NFC module can be implemented based on radio frequency identification (RFID) technology, infrared data association (IrDA) technology, ultra-wideband (UWB) technology, Bluetooth (BT) technology and other technologies.

In exemplary embodiments, the apparatus 1800 may be realized with one or more application specific integrated circuits (ASIC), digital signal processors (DSP), digital signal processing devices (DSPD), programmable logic devices (PLD), field programmable gate arrays (FPGA), controllers, micro-controllers, microprocessors or other electronic components, for performing above mentioned method.

In exemplary embodiments, there is also provided a non-transitory computer readable storage medium including instructions, for example, a memory 1802 including instructions, the above instructions may be executed by processor 1809 of apparatus 1800 to perform the above described method. For example, the non-transitory computer readable storage medium may be a ROM, a random access memory (RAM), a CD-ROM, a magnetic tape, a floppy disk and an optical data storage device etc.

In one embodiment, when the instructions in the storage medium are executed by the processor, the apparatus 1800 is capable of executing any one of the above described cross-carrier scheduling methods used for a terminal.

After considering this description and carrying out the embodiments disclosed herein, those skilled in the art may easily think of other embodiments of the present disclosure. The present application is meant to cover any variations, usage or adaptive change of the present disclosure, and these variations, usage or adaptive change follow general concept of the present disclosure and include the common knowledge or the customary technical means in the technical field that is not disclosed in the present disclosure. The description and embodiments are only exemplary, and the real range and spirit of the present disclosure are defined by the following claims.

It should be understood that the present disclosure is not limited to precise structures that are described above and shown in the accompanying drawings, and may be modified and changed without departing from the range of the present disclosure. The scope of the present disclosure is only defined by the appended claims.

What is claimed is:

1. A cross-carrier scheduling method for a base station, the method comprising:
    sending scheduling information to a terminal, for cross-carrier scheduling a target bandwidth part on at least one target carrier by means of a scheduling carrier;
    wherein the target carrier is scheduled by the scheduling carrier and configured with at least one bandwidth part, the at least one bandwidth part is a frequency domain resource pre-designated on the scheduling carrier; and the target bandwidth part is scheduled by the scheduling carrier among all bandwidth parts on the target carrier;
    wherein physical resource blocks (PRBs) on each carrier configured for the terminal are separately numbered in a predefined order, bandwidth parts on each carrier are independently numbered in units of PRBs in a predefined order, and the scheduling information comprises: association information; and PRB indication information for indicating a scheduled PRB;
    wherein the association information is information associated with carrier indication information and bandwidth part indication information, the carrier indication information indicates a scheduled carrier, and the bandwidth part indication information indicates a scheduled bandwidth part on the scheduled carrier, wherein the association information is a scrambling sequence for scrambling physical broadcast channel (PBCH) or synchronization signal (SS) block;
    wherein the association information is predefined or configured by the base station for the terminal, and when the association information is configured by the base station for the terminal, the method further comprises: sending the association information to the terminal by target signaling, wherein the target signaling comprises any one of: radio resource control signaling, system information, a media access control address control unit and physical layer signaling.

2. The method according to claim 1, wherein the sending scheduling information to a terminal comprises:
    sending scheduling information to the terminal by means of the target signaling.

3. The method according to claim 1, wherein the scheduling information further comprises:
    the carrier indication information for indicating the scheduled carrier; and
    the PRB indication information for indicating the scheduled PRB on the scheduled carrier.

4. The method according to claim 1, wherein PRBs on all carriers configured for the terminal are numbered uniformly in the predefined order.

5. The method according to claim 1, wherein the scheduling information further comprises:
    the carrier indication information for indicating the scheduled carrier;
    the bandwidth part indication information for indicating the scheduled bandwidth part on the scheduled carrier; and the PRB indication information for indicating the scheduled PRB in the scheduled bandwidth part on the scheduled carrier.

6. The method according to claim 5, wherein an information length value of the carrier indication information is a first preset value, and is set in a first preset position in the scheduling information;
an information length value of the bandwidth part indication information is a second preset value, and is set in a second preset position in the scheduling information;
wherein the first preset position is the same as or different from the second preset position.

7. A cross-carrier scheduling method for a terminal, the method comprising:
receiving scheduling information sent by a base station;
determining a target bandwidth part on at least one target carrier according to the scheduling information;
scheduling the target bandwidth part by a scheduling carrier where the scheduling information is located;
wherein the target carrier is scheduled by the scheduling carrier and configured with at least one bandwidth part, the at least one bandwidth part is a pre-designated frequency domain resource on the target carrier; the target bandwidth part is scheduled by the scheduling carrier among all bandwidth parts on the target carrier;
wherein the determining a target bandwidth part on at least one target carrier according to the scheduling information comprises:
when the scheduling information includes association information and physical resource block (PRB) indication information for indicating a scheduled PRB, obtaining carrier indication information and bandwidth part indication information corresponding to the association information in the scheduling information according to a pre-stored mapping relationship among the association information, the carrier indication information and the bandwidth part indication information, wherein the association information is predefined or configured by the base station for the terminal, and the terminal receives the association information by target signaling comprising any one of: radio resource control signaling, system information, a media access control address control unit and physical layer signaling, wherein the association information is a scrambling sequence for scrambling physical broadcast channel (PBCH) or synchronization signal (SS) block;
using a carrier indicated by the carrier indication information as the target carrier; and
using the bandwidth part indication information and frequency domain resource corresponding to the PRB indication information in the target carrier as the target bandwidth part.

8. The method according to claim 7, wherein the determining a target bandwidth part on at least one target carrier according to the scheduling information comprises:
when the scheduling information includes carrier indication information for indicating a scheduled carrier and physical resource block (PRB) indication information for indicating a scheduled PRB on the scheduled carrier, using the carrier indicated by the carrier indication information as the target carrier; and
using frequency domain resource corresponding to the PRB indication information on the target carrier as the target bandwidth part.

9. The method according to claim 7, wherein the determining a target bandwidth part on at least one target carrier according to the scheduling information comprises:
when the scheduling information includes physical resource block (PRB) indication information of a scheduled PRB, using the frequency domain resource corresponding to the PRB indication information as the target bandwidth part.

10. The method according to claim 7, wherein the determining a target bandwidth part on at least one target carrier according to the scheduling information comprises:
when the scheduling information includes carrier indication information for indicating a scheduled carrier, bandwidth part indication information for indicating a scheduled bandwidth part on the scheduled carrier, and physical resource block (PRB) indication information for indicating a scheduled PRB in the scheduled bandwidth part on the scheduled carrier, using the carrier indicated by the carrier indication information as the target carrier; and
using the bandwidth part indication information and a frequency domain resource corresponding to the PRB indication information in the target carrier as the target bandwidth part.

11. A terminal, comprising:
a processor; and
a memory for storing instructions executable by the processor;
wherein the processor is configured to perform the method of claim 7.

12. A base station, comprising:
a processor; and
a memory for storing instructions executable by the processor;
wherein the processor is configured to:
send scheduling information to a terminal, for cross-carrier scheduling a target bandwidth part on at least one target carrier by means of a scheduling carrier;
wherein the target carrier is scheduled by the scheduling carrier and configured with at least one bandwidth part, the at least one bandwidth part is a frequency domain resource pre-designated on the target carrier; and the target bandwidth part is scheduled by the scheduling carrier among all bandwidth parts on the target carrier;
wherein physical resource blocks (PRBs) on each carrier configured for the terminal are separately numbered in a predefined order, bandwidth parts on each carrier are independently numbered in units of PRBs in a predefined order, and the scheduling information comprises: association information; and PRB indication information for indicating a scheduled PRB;
wherein the association information is information associated with carrier indication information and bandwidth part indication information, the carrier indication information indicates a scheduled carrier, and the bandwidth part indication information indicates a scheduled bandwidth part on the scheduled carrier, wherein the association information is a scrambling sequence for scrambling physical broadcast channel (PBCH) or synchronization signal (SS) block;
wherein the association information is predefined or configured by the base station for the terminal, and when the association information is configured by the base station for the terminal, the method further comprises: sending the association information to the terminal by target signaling, wherein the target signaling comprises any one of: radio resource control signaling, system information, a media access control address control unit and physical layer signaling.

13. The base station according to claim 12, wherein the processor is further configured to:
send the scheduling information to the terminal by means of the target signaling.

14. The base station according to claim 12, wherein the scheduling information comprises:
the carrier indication information for indicating the scheduled carrier; and
the PRB indication information for indicating the scheduled PRB on the scheduled carrier.

15. The base station according to claim 12, wherein PRBs on all carriers configured for the terminal are numbered uniformly in the predefined order.

16. The base station according to claim 12, wherein the scheduling information further comprises:
the carrier indication information for indicating the scheduled carrier;
the bandwidth part indication information for indicating the scheduled bandwidth part on the scheduled carrier; and
the PRB indication information for indicating the scheduled PRB in the scheduled bandwidth part on the scheduled carrier.

17. The base station according to claim 12, wherein an information length value of the carrier indication information is a first preset value, and is set in a first preset position in the scheduling information;
an information length value of the bandwidth part indication information is a second preset value, and is set in a second preset position in the scheduling information;
wherein the first preset position is the same as or different from the second preset position.

* * * * *